(12) United States Patent
Polcuch et al.

(10) Patent No.: US 11,603,185 B2
(45) Date of Patent: Mar. 14, 2023

(54) SYNCHRONIZATION SYSTEM FOR DISTRIBUTED ELECTROMECHANICAL ACTUATION SYSTEM

(71) Applicant: Parker-Hannifin Corporation, Cleveland, OH (US)

(72) Inventors: Eric A. Polcuch, Mission Viejo, CA (US); David J. Bouman, Kalamazoo, MI (US)

(73) Assignee: Parker-Hannifin Corporation, Cleveland, OH (US)

(*) Notice: Subject to any disclaimer, the term of this patent is extended or adjusted under 35 U.S.C. 154(b) by 676 days.

(21) Appl. No.: 16/701,473

(22) Filed: Dec. 3, 2019

(65) Prior Publication Data
US 2020/0172229 A1     Jun. 4, 2020

Related U.S. Application Data

(60) Provisional application No. 62/774,990, filed on Dec. 4, 2018.

(51) Int. Cl.
*B64C 13/50*     (2006.01)
*B64D 41/00*     (2006.01)
(Continued)

(52) U.S. Cl.
CPC .............. *B64C 13/50* (2013.01); *B64C 13/16* (2013.01); *B64C 13/40* (2013.01); *B64D 41/00* (2013.01);
(Continued)

(58) Field of Classification Search
CPC ......... B64C 13/50; B64C 13/16; B64C 13/40; B64C 9/26; B64C 9/20; B64D 41/00;
(Continued)

(56) References Cited

U.S. PATENT DOCUMENTS 7,556,224 B2*   7/2009   Johnson .................. B64C 13/50
                                                                                                               244/175
8,276,842 B2*   10/2012   Kracke ................... B64C 13/28
                                                                                                               244/99.2

(Continued)

*Primary Examiner* — Valentina Xavier
(74) *Attorney, Agent, or Firm* — Renner, Otto, Boisselle & Sklar, LLP

(57) ABSTRACT

A mechanical synchronization device for a distributed system. A plurality of actuators actuate movement of control surface components of an aircraft. Each actuator has a first end coupled to a structure of the aircraft and a second end coupled to a control surface component, and a drive path from a motion provider to the control surface component, the control surface component being configured to move along the respective drive path. A power module controller is operable to simultaneously output motor drive power from a power module through an electrical bus to at least two of the motion providers in a synchronous or nearly synchronous manner to actuate movement of control surface components. The mechanical synchronization device is between at least two of the actuators and transfers torque between the actuators to maintain symmetry between the actuators. A load limiting device may limit the power transferred through the mechanical synchronization device.

21 Claims, 13 Drawing Sheets

(51) Int. Cl.
  *B64C 13/40*  (2006.01)
  *F16H 19/02*  (2006.01)
  *B64C 13/16*  (2006.01)

(52) U.S. Cl.
  CPC ......... *F16H 19/02* (2013.01); *B64D 2221/00* (2013.01)

(58) Field of Classification Search
  CPC ..... B64D 2221/00; F16H 19/02; F16H 25/20; F16H 2025/2053; F16H 2025/2081; Y02T 50/40
  See application file for complete search history.

(56) References Cited

U.S. PATENT DOCUMENTS

| | | | | |
|---|---|---|---|---|
| 9,190,942 | B2* | 11/2015 | Polcuch | H02P 8/40 |
| 10,315,753 | B2* | 6/2019 | McCormick | B64C 13/0425 |
| 2020/0156766 | A1* | 5/2020 | Tzabari | B64C 9/02 |
| 2020/0307775 | A1* | 10/2020 | Tzabari | B64C 13/38 |

\* cited by examiner

SYNCHRONIZATION SYSTEM FOR DISTRIBUTED ELECTROMECHANICAL ACTUATION SYSTEM

RELATED APPLICATION DATA

This application claims the benefit of U.S. Provisional Application No. 62/774,990 filed on Dec. 4, 2018, which is hereby incorporated herein by reference in its entirety.

FIELD OF THE INVENTION

The present invention relates generally to distributed electromechanical actuation systems, and more particularly to a mechanical synchronization system for use in distributed elecromechanical actuation systems.

BACKGROUND

For systems that require multiple outputs to operate synchronously such as aircraft flaps and slats, thrust reversers, large door drives, etc., electrical synchronization where an electric motor(s) is located at each drive station may have many benefits over traditional complex mechanical drive systems. One such implementation of this might be low slip induction motors running on a single controller as described in the near synchronous induction motor drive actuation system in U.S. Pat. No. 9,190,942 though other motor types may be incorporated.

The inventors have identified two potential negative aspects of this approach. Accordingly, there remains a need for further contributions in this area of technology.

SUMMARY OF INVENTION

The present invention is directed to distributed systems having two or more electromechanical actuators with one or more motors, which in some embodiments may provide primary motive power, per actuator that are required to operate in a synchronous or nearly synchronous manner, in which a mechanical synchronization system between actuators transfers torque between the actuators to maintain symmetry between the actuators and/or manage jam conditions in unison.

According to one aspect of the invention, a distributed system includes a plurality of actuators for actuating movement of one or more control surface components of an aircraft, wherein each actuator has a first end coupled to a structure of the aircraft and a second end coupled to one of the one or more control surface components and each actuator additionally includes a drive path from a motion provider to the one or more control surface components, wherein the one or more control surface components is configured to move along the respective drive path; a power module controller operable to simultaneously output motor drive power from a power module through an electrical bus to at least two of the plurality of the motion providers in a synchronous or nearly synchronous manner to actuate movement of the one or more control surface components; and, a mechanical synchronization device between at least two of the plurality of actuators that transfers torque between the at least two actuators to maintain symmetry between the actuators.

Embodiments of the invention may include one or more of the following additional features separately or in combination.

The mechanical synchronization device may be configured to transfer motion between at least two actuators to maintain symmetry between the at least two actuators.

The mechanical synchronization device may be configured to prevent motion between at least two actuators to maintain symmetry between the at least two actuators.

The motion provider may include an induction motor and/or a brushless DC servo motor (BLDC).

The mechanical synchronization device may include a flexible synchronization shaft.

The mechanical synchronization device may include a rigid shaft, a universal joint, and/or an angle gearbox.

The mechanical synchronization device may be sized to transfer torque between the at least two actuators up to a predetermined threshold torque associated with asymmetric loading between the at least two actuators.

The mechanical synchronization device may transfer mechanical power from actuators that are leading the average position to actuators that are lagging the average position.

The mechanical synchronization device may transfer mechanical power from motion providers that are leading the average position to motion providers that are lagging the average position.

The mechanical synchronization device may include a load limiting device that locks an actuator when the actuator reaches a predetermined threshold torque.

The load limiter may lock the output of an actuator.

The load limiter may lock a flexible or rigid synchronization shaft of the mechanical synchronization device.

The load limiter may lock at a structure disposed between an output of an actuator and a flexible synchronization shaft of the mechanical synchronization device.

The load limiter may include a locking torque brake and/or a wedging worm gear load limiter.

The distribution system may further include a gear train compliance to cushion torque brake locking impact.

The mechanical synchronization device may incorporate a predetermined lost motion to tailor the output response of the system.

The motion providers may include low slip induction motors, and the power module controller may control the motors to follow a predetermined Volts per Frequency (V/F) profile in an open loop manner such that closed loop speed and/or position control of each motor is not required.

An output position error of the system may be a function of motor load and slip differences between actuator stations.

The motion providers may include a brushless DC motor (BLDC), a brush motor, and/or a stepper motor, and the power module controller may be configured to control the motors to follow a predetermined position profile in a closed loop manner.

According to another aspect of the invention, a distributed system includes a plurality of electromechanical servo actuators for actuating movement of one or more control surface components of an aircraft, wherein each actuator has a first end coupled to a structure of the aircraft and a second end coupled to one of the one or more control surface components and each actuator additionally includes a drive path from a motion provider to the one or more control surface components, wherein the one or more control surface components is configured to move along the respective drive path; a controller operable to output motor drive power from a power module through a bus to at least two of the plurality of the motion providers in a synchronous or nearly synchronous manner to actuate movement of the one or more control surface components; and, a mechanical synchronization device between at least two of the plurality of actuators that transfers torque between the at least two actuators to maintain symmetry between the actuators.

According to another aspect of the invention, a distributed system includes a plurality of hydraulic motor driven actuators for actuating movement of one or more control surface components of an aircraft, wherein each actuator has a first end coupled to a structure of the aircraft and a second end coupled to one of the one or more control surface components and each actuator additionally includes a drive path from a motion provider to the one or more control surface components, wherein the one or more control surface components is configured to move along the respective drive path; a controller operable to output flow control commands to a hydraulic control valve system to provide hydraulic flow to at least two of the plurality of the motion providers in a synchronous or nearly synchronous manner to actuate movement of the one or more control surface components; and, a mechanical synchronization device between at least two of the plurality of actuators that transfers torque between the at least two actuators to maintain symmetry between the actuators.

DETAILED DESCRIPTION

Figure 1:
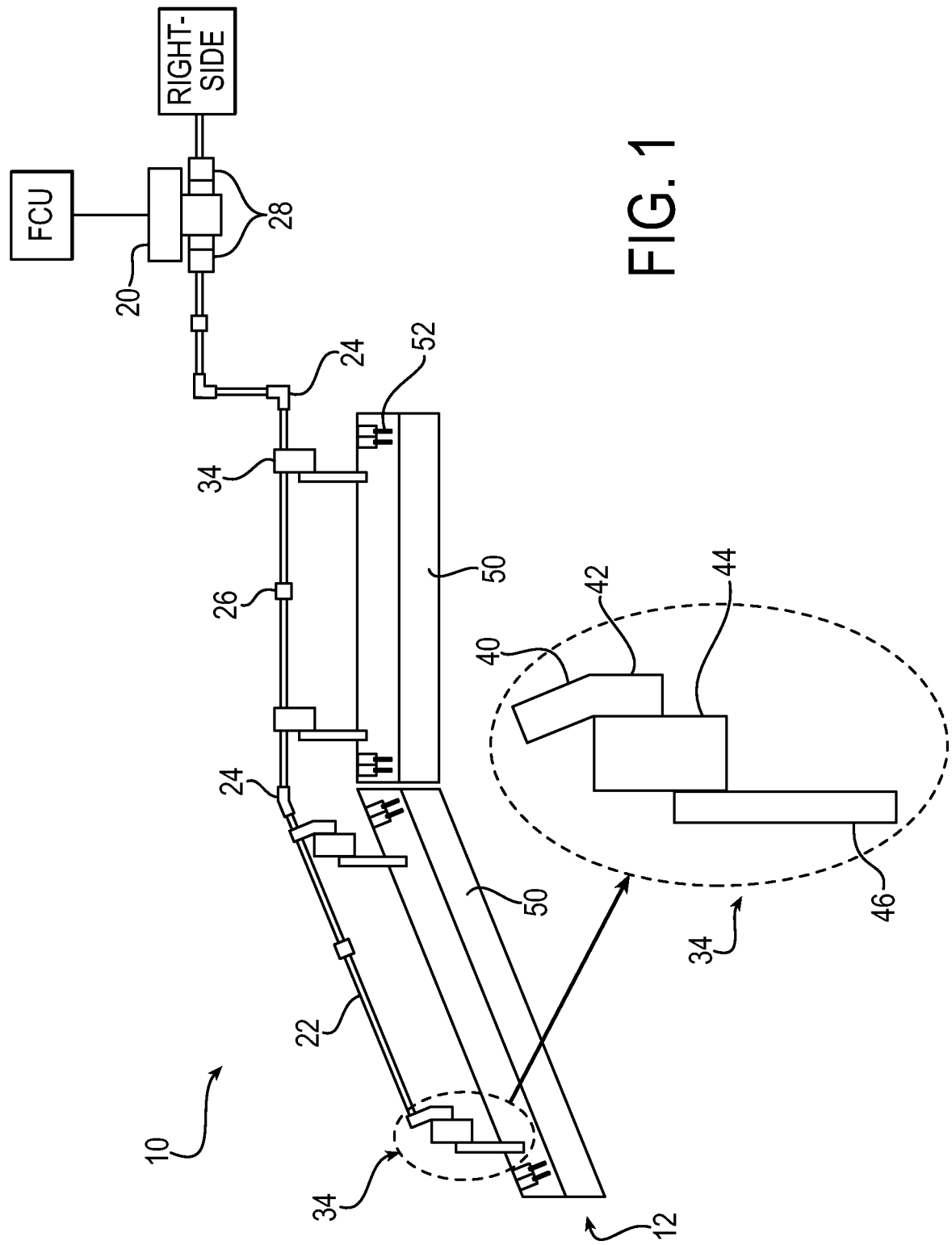
FIG. 1 is an exemplary aircraft wing including a mechanically synchronized distributed system.

While the present invention can take many different forms, for the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications of the described embodiments, and any further applications of the principles of the invention as described herein, are contemplated as would normally occur to one skilled in the art to which the invention relates.

FIG. 1 shows a traditional mechanically synchronized distributed system 10, or distributed system 10, on a wing 12 of an aircraft, only the left-side wing 12 being shown for brevity and simplicity. The system 10 includes a torque tube system that includes a central power drive unit 20, torque tubes 22, angle gear boxes 24, support bearings 26, torque brakes 28, among other components. A flight control unit (FCU) controls the system 10. The torque tubes 22 are coupled to actuators 34 in which each actuator includes a torque brake 40, angle gearbox 42, reduction gears 44, and an output member 46. The output member 46, in turn, is coupled to a primary control surface such as an elevator, a rudder, or an aileron, or to a secondary control surface such as the illustrated flap panel 50, a slat, or a spoiler. The flaps 50 may be equipped with disconnect/skew sensors 52, as shown. As was described in U.S. Pat. No. 9,190,942, which is incorporated herein by reference in its entirety, the torque tube system of the traditional mechanically synchronized system is heavy and creates congestion.

Figure 2:
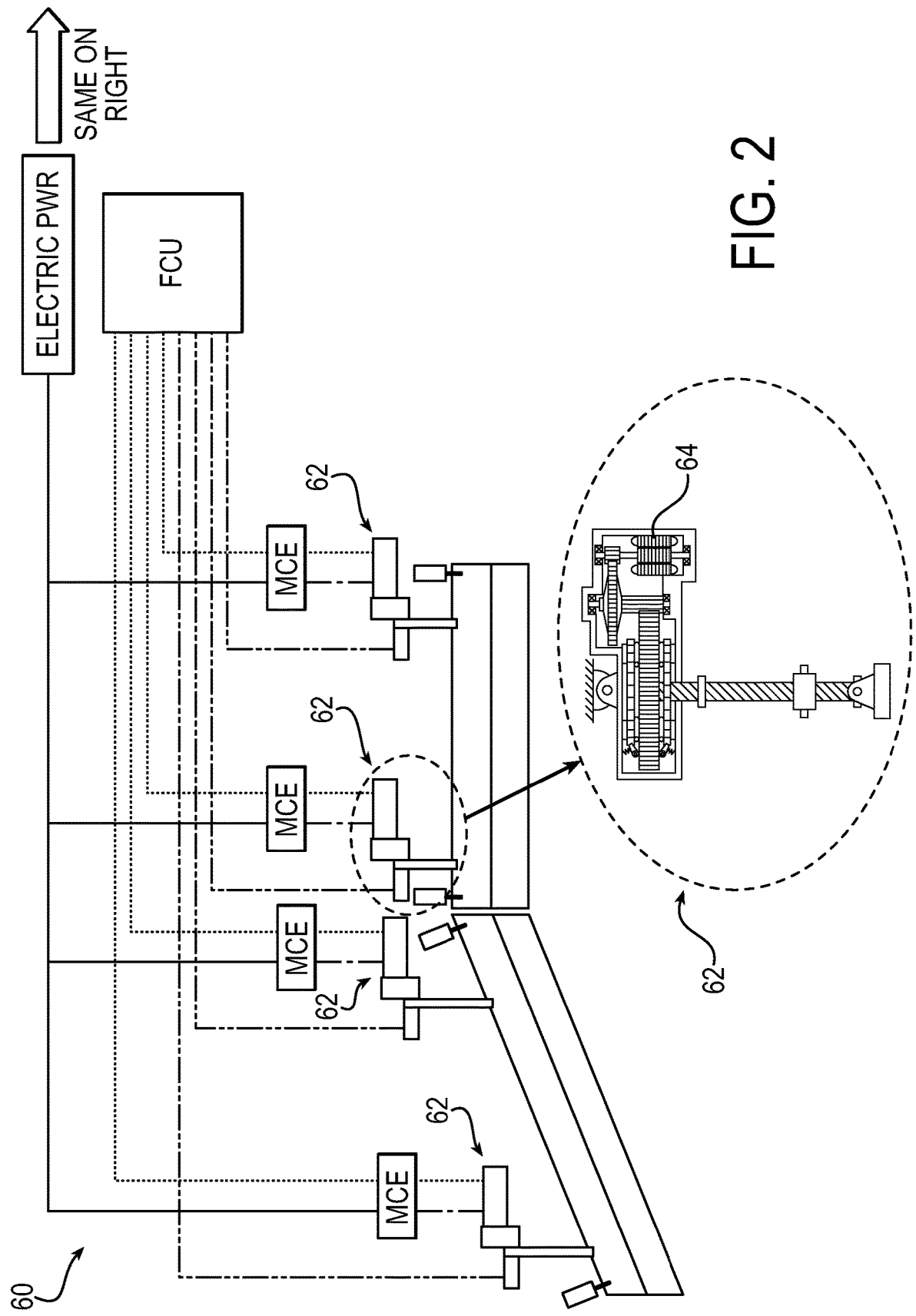
FIG. 2 is an exemplary aircraft wing including a distributed system made up of distributed brushless DC motor servo actuators.

FIG. 2 shows a distributed system 60 made up of distributed brushless DC electric motor (BLDC EM) servo actuators 62. The system 60 is a fully electrically servo operated system. Each actuator 62 includes a brushless DC electric motor 64 sized for a single actuator load. A flight control unit (FCU) controls the system 60. Actuator motor control electronics (MCE) control the respective servo actuators 62. These types of systems are burdened with numerous electronics on the wing but still may benefit from the invention described herein.

Figure 3:
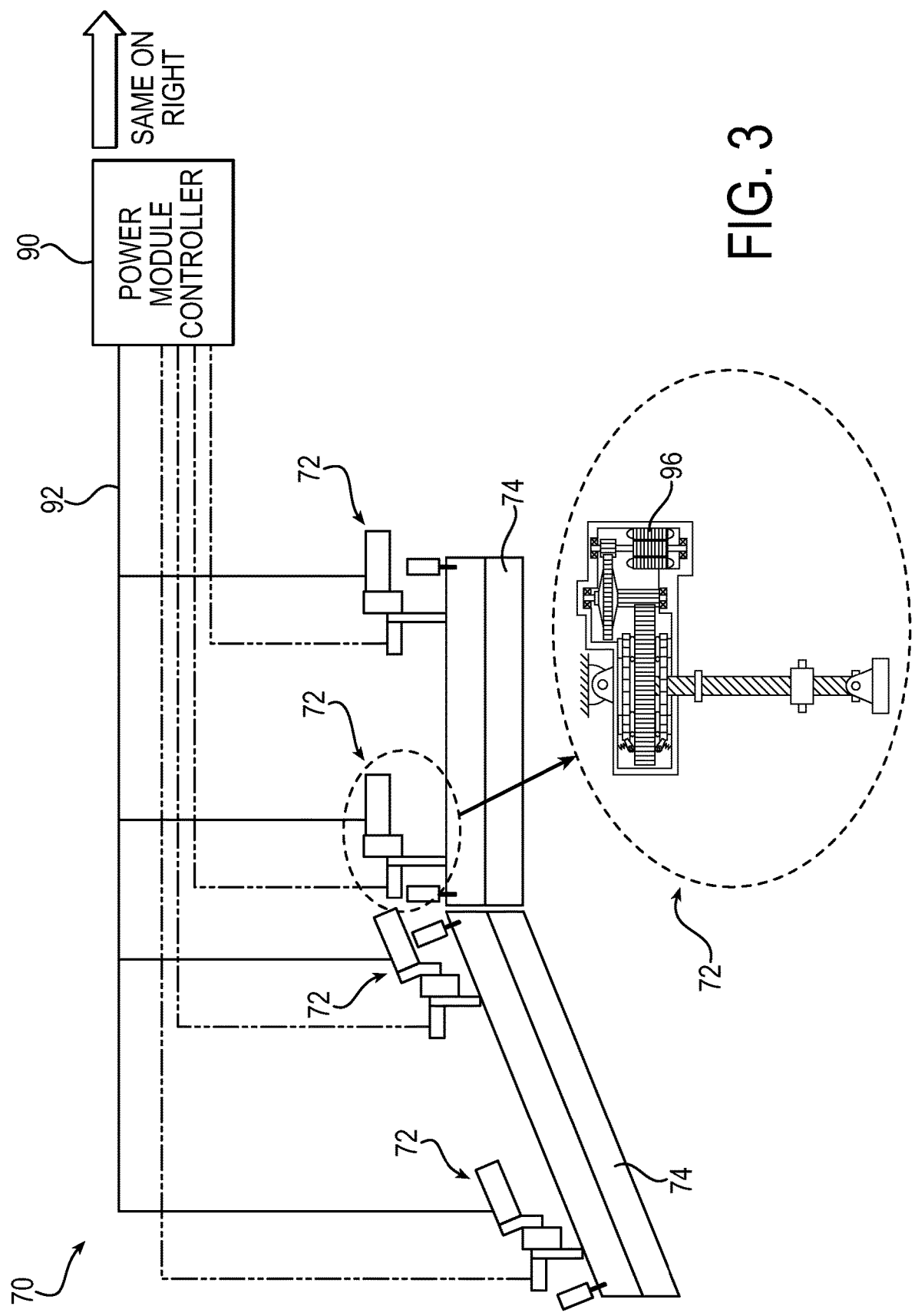
FIG. 3 is an exemplary aircraft wing including a distributed system that includes a plurality of actuators each including motion providers, the motion providers operated in a synchronous manner or nearly synchronous manner.
Figure 4:
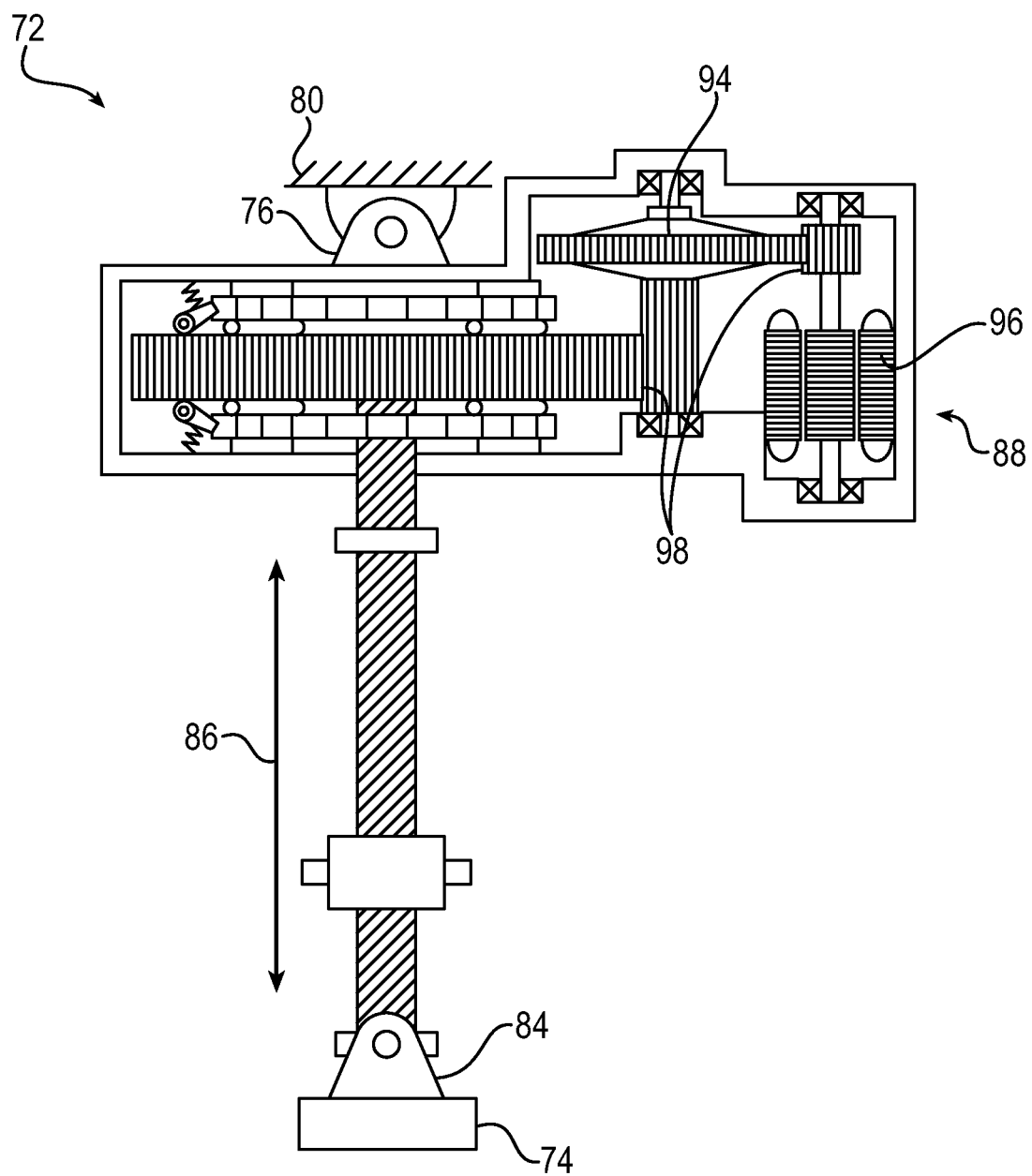
FIG. 4 is an exemplary actuator for use in the system illustrated in FIG. 3.

FIGS. 3 and 4 show a distributed system 70 that includes a plurality of actuators 72 for actuating movement of flight control surfaces 74. As shown in FIG. 4, each actuator 72 has a first end 76 coupled to a structure 80 of the aircraft and a second end 84 coupled to the corresponding control surface 74. Each actuator 72 additionally includes a drive path 86 from a motion provider 88 to the flight control surface 74, wherein the flight control surface 74 is configured to move along the respective drive path 86. Referring to FIG. 3, reference number 90 illustrates a power module and power module controller, a single power module and power module controller 90 in the illustrative embodiment. The power module controller 90 is operable to simultaneously output motor drive power through a common electrical bus 92 to the motion providers 88 in a synchronous manner or nearly synchronous manner to actuate movement of the flight control surfaces 74. The motion provider 88 can be a motor 96 and associated gearing 98. In the illustrative embodiment, the motor 96 is a three phase low slip induction motor although other motors may be used such an electric stepper motor, switched reluctance motor, or any other type of motor that can convert controlled electric power into controlled motor rotation with the use of motor position feedback. The motion provider 88 may include any of a brushless DC motor (BLDC), a brush DC motor, a stepper motor, among others. The actuator 72 also includes a mechanical overload protection device such as the illustrated slip clutch 94 or a load limiter. The slip clutch 94 or other uncoupling means prevents overload of the drive path 86 from the motion provider 88 (for example motor 96) through the associated gears 98. The system 70 may include additional or alternate components and function in a similar manner as the systems described in U.S. Pat. No. 9,190,942, which is incorporated herein by reference.

The distributed system 70 may require synchronous operation among multiple outputs such as aircraft flaps and slats, thrust reversers, large door drives, etc. and may utilize electrical synchronization where an electric motor(s) is located at each drive station. The distributed system 70, more particularly the electrical synchronization thereof, may have many benefits over the traditional complex mechanical drive systems such as the system 10. Some of the benefits of the distributed system 70 over the traditional mechanical drive system 10 are described in U.S. Pat. No. 9,190,942.

The inventors have identified two potential negative aspects in systems such as the distributed system 70, which may also be referred to herein as a near synchronous distributed system 70. First, there is the potential for non-absolute symmetry due to induction motor slip differences at different loads or due to servo loop inaccuracy in the case of servo controlled systems. Second, mitigation of jams in the actuators or movable structures may be of interest as rapid electrical mitigation of these jam conditions may not be sufficient or effective.

To mitigate these potential negative effects in systems where they exist, the inventors have developed a solution in which the primary motive power for each output location is provided by individual electric motor(s), however, a finer level of symmetry and/or jam management is provided by a mechanical synchronization device, or mechanical interconnect device, described in greater detail below.

Figure 5:
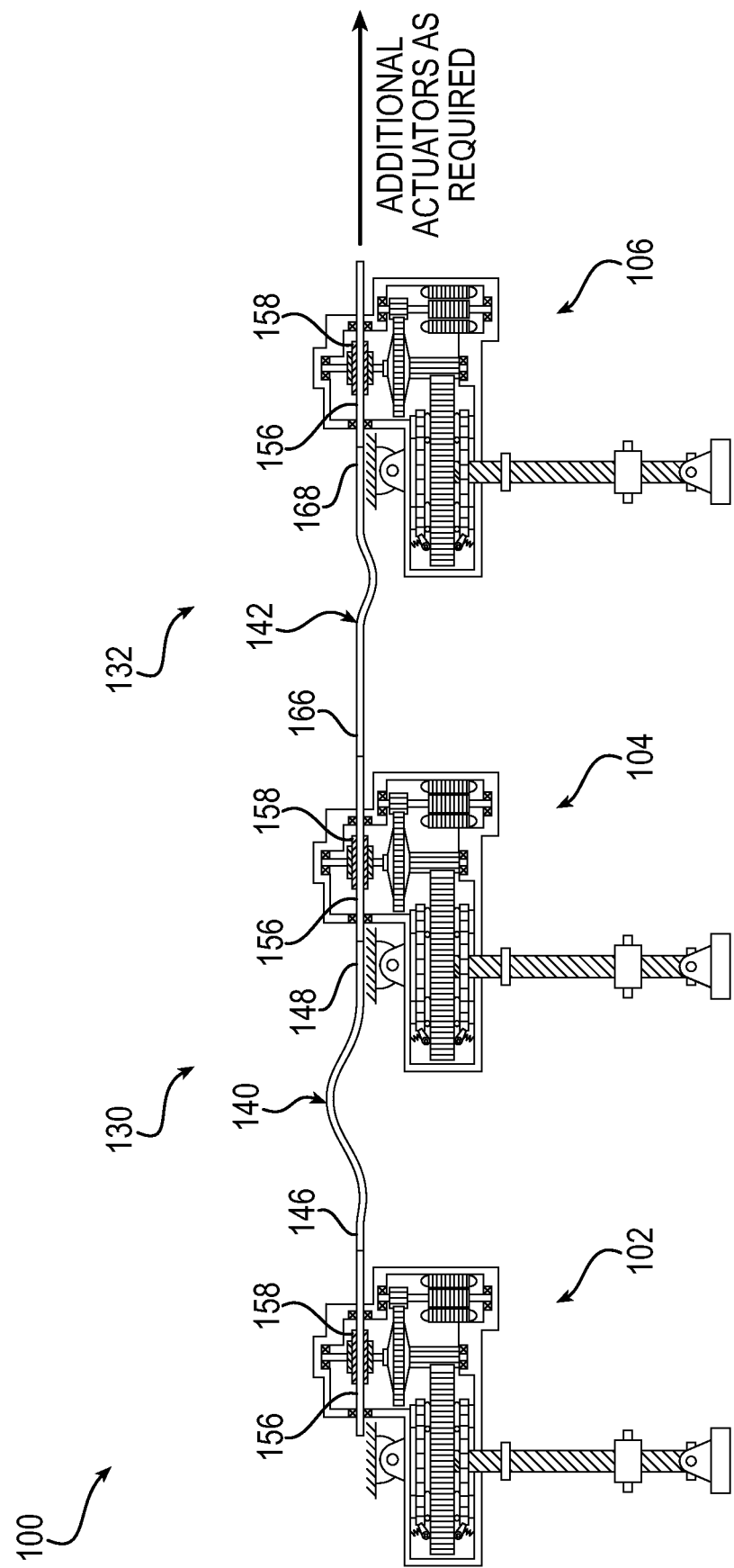
FIG. 5 is an exemplary distributed system according to an embodiment of the invention.
Figure 6:
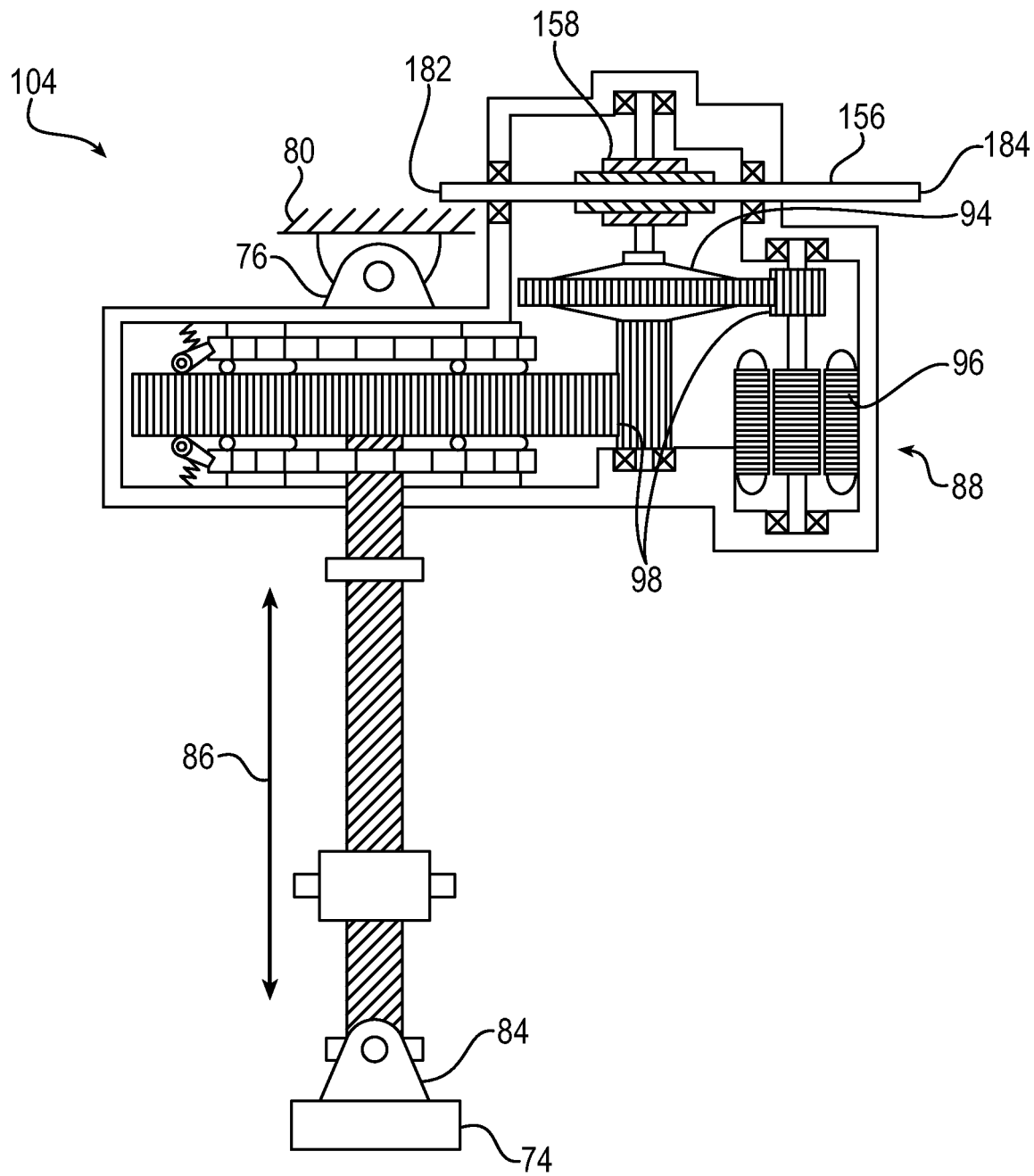
FIG. 6 is an exemplary actuator for use in the system illustrated in FIG. 5, according to an embodiment of the invention.

FIGS. 5 and 6 show an exemplary distributed system 100 according to an embodiment of the invention. The distributed system 100 is in many respects similar to the above-referenced distributed systems 60, 70 of FIGS. 2-4, and consequently the same reference numerals are used to denote structures corresponding to similar structures in the systems 60, 70. In addition, the foregoing description of the distributed systems 60, 70 is equally applicable to the distributed system 100 except as noted below. Moreover, it will be appreciated upon reading and understanding the specification that aspects of the distributed systems 60, 70, 100 may be substituted for one another or used in conjunction with one another where applicable.

The distributed system 100 includes a plurality of actuators, in the illustrative embodiment first, second, and third actuators 102, 104, 106, for actuating movement of flight control surfaces, such as the flap panels 74 illustrated in FIG. 3. FIG. 6 shows greater detail of one exemplary actuator 104, it being understood that the actuators 102 and 106 may be identically or similarly constructed as the actuator 104. Like the system 70 of FIGS. 3 and 4, each actuator 102, 104, 106 of the system 100 of FIGS. 5 and 6 has a first end 76 coupled to a structure 80 of the aircraft and a second end 84 coupled to a flight control surface 74. Each actuator 102, 104, 106 additionally includes a drive path 86 from a motion provider 88 to the flight control surface 74, wherein the flight control surface 74 is configured to move along the respective drive path 86. As in the FIG. 3 system 70, the FIG. 5 system 100 has a power module and power module controller 90 that is operable to simultaneously output motor drive power through a common electrical bus 92 to the motion providers 88 in a synchronous manner or nearly synchronous manner to actuate movement of the flight control surfaces 74. Although the illustrative embodiment includes a common electrical bus 92, it will be appreciated that individually controlled actuators 72 could alternatively be used.

The distributed system 100 of FIGS. 5 and 6 may be a near synchronous induction motor driven system of one or more motors each as described in U.S. Pat. No. 9,190,942, wherein the speed and/or position control of the system relies on the low slip induction motors closely following some specified Volts per Frequency (V/F) profile in an open loop manner such that closed loop speed and/or position control of each motor 96 is not required. In such a system the output position error generally is a function of motor load and slip differences between actuator stations.

Turning now to FIG. 5, the distributed system 100 also includes first and second mechanical synchronization devices 130, 132. The first mechanical synchronization device 130 is located between and coupled to the first and second actuators 102, 104 to transfer torque between the first and second actuators 102, 104, and transfer motion and/or prevent motion between the first and second actuators 102, 104. The second mechanical synchronization device 132 is located between and coupled to the second and third actuators 104, 106 to transfer torque between the second and third actuators 104, 106, and transfer motion and/or prevent motion between the second and third actuators 104, 106.

The inventors have found that the torque transfer between the actuators 102, 104, 106 provided by the mechanical synchronization devices 130, 132 aids in maintaining a tighter synchronization between the actuators 102, 104, 106 than is feasible with, for example, only the controlled low slip induction motors 96. If the motion providers 88 are operating in a synchronous manner, then the mechanical synchronization devices 130, 132 may not be required. However, if the motion providers 88 are not operating in a synchronous manner, for example in a nearly synchronous manner (i.e. an asynchronous manner), then the mechanical synchronization devices 130, 132 will augment such nearly synchronous operation to realize a synchronous operation unless the asynchronous operation is beyond a predetermined threshold as will be described in greater detail below.

The mechanical synchronization devices 130, 132 are sized for loads resulting from minor asymmetries in the applied loads between actuator stations. Such loads typically will be significantly lower than for example the loads taken up by the torque tube system of the traditional mechanically synchronized distributed system 10. The mechanical synchronization devices 130, 132 transfer torque and either transfer motion between two actuators 102, 104, 106 or prevent motion between two actuators 102, 104, 106, to maintain symmetry between the actuators 102, 104, 106. The mechanical synchronization devices 130, 132 may include a load limiting device that limits the power transferred through the mechanical synchronization device 130, 132. Those skilled in the art will appreciate that, although the mechanical synchronization devices 130, 132 are described herein in the context of transferring rotary power, more particularly transferring torque between actuators 102, 104, 106, the mechanical synchronization devices 130, 132 may also or alternatively be configured for linear power transfer, more particularly transferring force between two actuators. The mechanical synchronization devices 130, 132 may employ any suitable force transfer mechanism to realize such linear power transfer, including, for example, push/pull cables, pulley and cable systems, rods, linkages, and bell cranks, to name a few.

The mechanical synchronization devices 130, 132 transfer mechanical power from motors/actuators that are leading the average position to those motors/actuators that are lagging the average position. This mechanical power is typically small relative to, for example, the size of mechanical components required to carry the full power of the many outputs as the primary driving source. The mechanical synchronization devices 130, 132 may include, for example, flexible shafts as illustrated herein and described below, and/or any other mechanical power transmission device or devices, including, for example, rigid shafts such as torque tubes, and/or universal joints, and/or angle gearboxes, depending on the system constraints and/or design requirements. Advantageously, in the system 100 of FIGS. 5 and 6, the mechanical synchronization devices 130, 132 may be sized for only the asymmetric loading of the system in contrast to the full driving power requirements of, for example, the traditional mechanically driven system 10, thus saving weight and envelope in the system.

As shown in FIGS. 5 and 6, the mechanical synchronization device 130 includes a flexible synchronization shaft 140 that is connected at its opposite ends 146, 148 to the actuators 102, 104 by means of a worm shaft 156 and worm gear 158 arrangement coupled to each of the actuators 102, 104. Similarly, the mechanical synchronization device 132 includes a flexible synchronization shaft 142 that is connected at its opposite ends 166, 168 to the actuators 104, 106 by means of a worm shaft 156 and worm gear 158 arrangement coupled to each of the actuators 102, 104. As will be appreciated, the gears could alternately or also be one or more of a spur, helical, bevel, spiral, Zerol, hypoid, among others.

It will further be appreciated that hydraulic motion transfer components could be used alternate to or in addition to a gear arrangement. For example, in an hydraulic system each actuator may have a piston in cylinder that is analog to the motor and output stage, as well as a mechanical interconnect typically consisting of acme screws/nut assembly, worm or bevel gears and flexible shafts.

Turning to FIG. 6, the primary driver 96, which is a near synchronous induction motor 96 in the illustrative embodiment, drives the slip clutch 94 which, in turn, drives the worm gear 158. Rotation of the worm gear 158 translates into rotation of the worm shaft 156. In the present embodiment, the rotation axis of the worm shaft 156 is at 90 degrees relative to the rotation axis of the worm gear 158 although it will be appreciated that angles other than 90 degrees are also contemplated. One end 182 of the worm shaft 156 is connected to an end 148 of the flexible synchronization shaft 140; the opposite end 184 of the worm shaft 156 is connected to an end 166 of the flexible synchronization shaft 142.

For the distributed system 100 of FIGS. 5 and 6, or in any system in which two or more electromechanical actuators 102, 104, 106 with one or more motors 96 per actuator are required to operate with high symmetry and or manage jam conditions in unison, the actuators 102, 104, 106 may be fit with the mechanical synchronization devices 130, 132 in a manner sufficient to transfer torque from one actuator to the other(s) to maintain symmetry. The flexible synchronization shafts 140, 142 rotate with the actuators 102, 104, 106. If the actuators 102, 104, 106 are all moving symmetrically, the flexible synchronization shafts 140, 142 are driven at the same speed at their respective opposite ends and therefore do not take any torque and merely rotate.

The motors 96 drive the actuators 102, 104, 106 symmetrically but when there are for example unbalanced loads or jam loads then one or more of the actuators 102, 104, 106 may get ahead of or behind the other actuators and be out of symmetry; that is, one or more of the actuators 102, 104, 106 may operate asymmetrically. For example, if the actuators 102, 104 operate asymmetrically then the rotation of the flexible synchronization shaft 140 at either end 146, 148 is not the same. The difference in torque is carried through the flexible synchronization shaft 140. Similarly, if the actuators 104, 106 operate asymmetrically then the rotation of the flexible synchronization shaft 142 at either end 166, 168 is not the same, and the difference in torque is carried through the flexible synchronization shaft 142. Thus, for example, the relatively faster actuators get slowed down by delivering torque to the flexible synchronization shaft and the relatively slower actuators get sped up by receiving torque from the flexible synchronization shaft.

When for example actuator 102 locks up, actuator 104 continues to drive until it reaches its slip clutch overload protection running through the flexible synchronization shaft 140. The torque will eventually build up in each of the other actuators 104, 106, through the flexible synchronization shafts 140, 142 until the respective slip clutches 94 in those actuators 104, 106 slip. The asymmetry in the actuators 102, 104, 106 is taken up by the flexible synchronization shafts 140, 142 until the slip clutches 94 slip due to increased torque in the flexible synchronization shafts 140, 142 that reaches a predetermined threshold torque. The system 100 locks up when the combined torque of the outputs and flexible synchronization shafts 140, 142 are high enough that the slip clutches 94 slip. The slip clutches 94 limit the amount of torque that the motors 96 can input into the system 100. As a result of the slip in the slip clutches 94, the worm gear 158 stops rotating and the output, for example the drive path 86 components, stop turning because they are connected directly to the worm gear 158.

It will be appreciated that if the actuators 102, 104, 106 are all connected to the same structure, for example, the structure 80 of the aircraft and/or the flight control surface 74, the structure will have some stiffness factored into the response of the actuators 102, 104, 106. Thus, if actuator 102 jams up then actuator 104 is going to have some spring rate through the structure back to the actuator 102. Similarly, the actuator 106 will have some spring rate through the structure back to actuators 102, 104. Thus, there will be a load increase in each of the actuators 102, 104, 106 due to structure they are coupled to, the stiffness of that structure, plus the stiffness of the flexible synchronization shafts 140, 142. As will be appreciated, the time at which the distributed system 100 locks up thus will depend on the stiffness of the flexible synchronization shafts 140, 142, the efficiency of the worm shaft 156 and worm gear 158 arrangement, and the stiffness of the structure that the actuators 102, 104, 106 are coupled to.

Thus, the mechanical synchronization devices 130, 132, in the illustrative embodiment the flexible synchronization shafts 140, 142, transfer torque between one actuator 102, 104, 106 and another actuator 102, 104, 106, and transfer motion and/or prevent motion between one actuator 102, 104, 106 and another actuator 102, 104, 106, in response to asymmetry between the two actuators 102, 104, 106, to maintain symmetry between the two actuators 102, 104, 106. The mechanical synchronization devices 130, 132 may transfer motion between one actuator 102, 104, 106 and another actuator 102, 104, 106, for example by the flexible synchronization shafts 140, 142 slowing down relatively faster actuators 102, 104, 106 and speeding up relatively slower actuators 102, 104, 106, which will be described in greater detail below. The mechanical synchronization devices 130, 132 may prevent motion between one actuator 102, 104, 106 and another actuator 102, 104, 106, for example by locking the flexible synchronization shafts 140, 142 of the mechanical synchronization devices 130, 132, which will also be described in greater detail below for example in the context of load limiters. In any event, if the torque between two actuators 102, 104, 106 exceeds a predetermined threshold torque, then the system 100 stalls. Again, however, the full torque of the system is not carried in the flexible synchronization shafts 140, 142, in contrast to the traditional mechanically synchronized distributed system 10 where all the torques including jam torques are carried through the torque tubes.

The flexible synchronization shafts 140, 142 are bidirectional and take up torque as a function of the amount of asymmetry in the position of the actuators 102, 104, 106, in addition to the amount of stiffness in the flexible synchronization shafts 140, 142 and the stiffness in the system 100. As the actuators 102, 104, 106 become more asymmetric in operation, the flexible synchronization shafts 140, 142 wind up, and as the flexible synchronization shafts 140, 142 wind up they carry more torque. The torque is transmitted between actuators 102 and 104 by flexible synchronization shaft 140, and between actuators 104 and 106 by flexible synchronization shaft 142, until the loads through the structure and the loads through the flexible synchronization shafts 140, 142 reach a predetermined threshold load that causes the system 100 to stall. If, in the case of an asymmetric load, the system loads do not reach the predetermined threshold load and stall condition, a relatively higher loaded actuator will be aided by the other, relatively lower, loaded actuators. Thus, actuator 104 and actuator 106 could assist actuator 102 to cure asymmetry without the system 100 locking up if the asymmetric loads are not higher than a predetermined threshold value.

Figure 7:
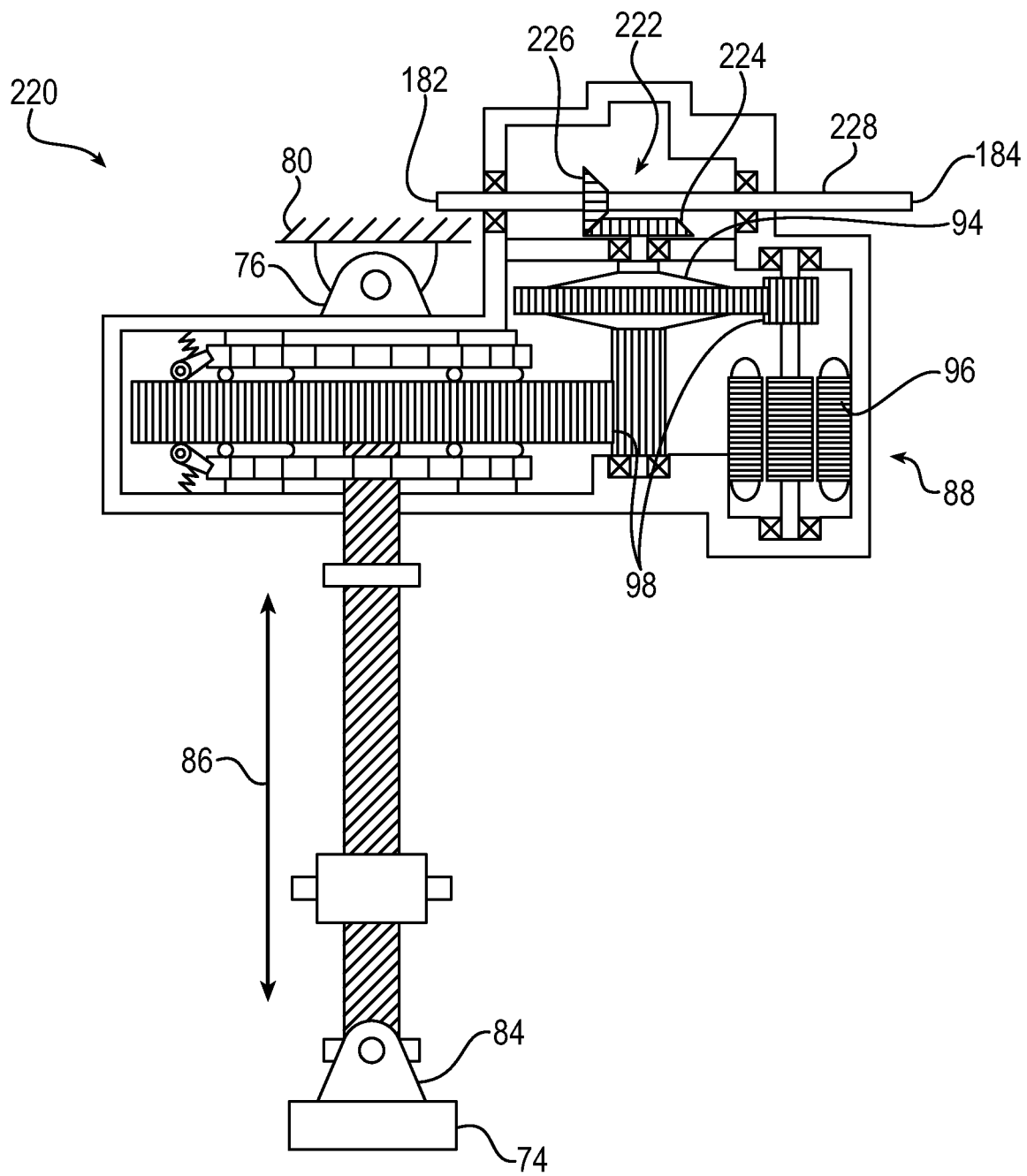
FIG. 7 is an exemplary actuator for use in the system illustrated in FIG. 5, according to another embodiment of the invention.
Figure 8:
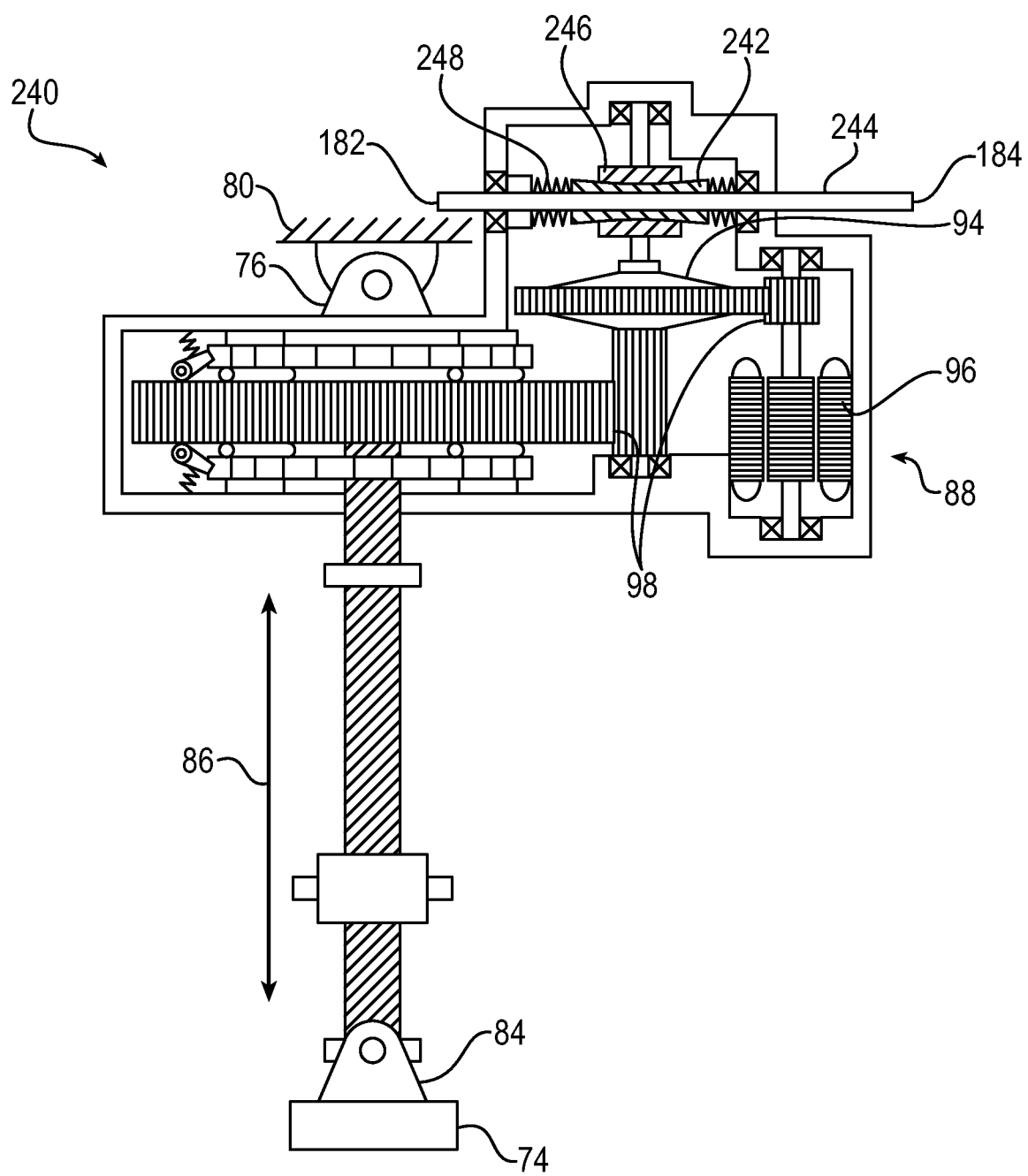
FIG. 8 is an exemplary actuator for use in the system illustrated in FIG. 5, according to another embodiment of the invention.
Figure 9:
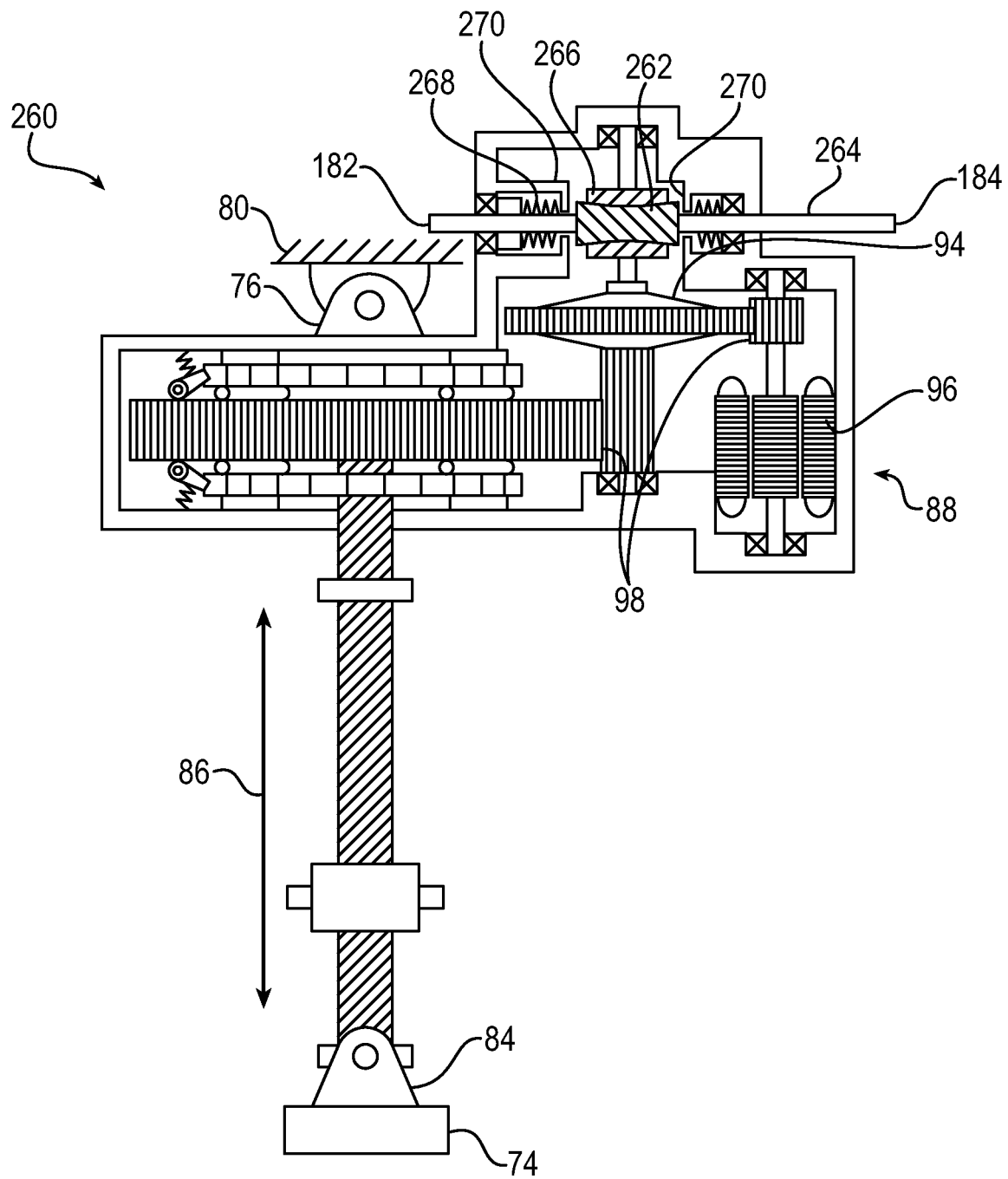
FIG. 9 is an exemplary actuator for use in the system illustrated in FIG. 5, according to another embodiment of the invention.

FIGS. 7-9 show respective actuators 220, 240, 260 according to another embodiment of the invention. The actuators 220, 240, 260 are in many respects similar to the above-referenced actuator 104 of FIG. 6, and consequently the same reference numerals are used to denote structures corresponding to similar structures in the actuator 104. In addition, the foregoing description of the actuator 104 is equally applicable to the actuators 220, 240, 260 except as noted below. Moreover, it will be appreciated upon reading and understanding the specification that aspects of the actuators 104, 220, 240, 260 may be substituted for one another or used in conjunction with one another where applicable.

As was noted above, the gear arrangement of the actuator can take the form of one or more of a spur, helical, bevel, spiral, Zerol, hypoid, among others. In the FIG. 7 actuator 220 a bevel gear arrangement 222 is provided. One bevel gear 224 is mounted to the output shaft of the slip clutch 94. The other bevel gear 226 is mounted to a torque transfer shaft 228. Referring briefly again to FIG. 5, one end 182 of the torque transfer shaft 228 is connected to an end 148 of the flexible synchronization shaft 140. The other end 184 of the torque transfer shaft 228 is connected to an end 166 of the flexible synchronization shaft 142. Turning to FIG. 7, the primary driver 96, which is a near synchronous induction motor 96 in the illustrative embodiment, drives the slip clutch 94 which, in turn, drives the bevel gear 224. Rotation of the bevel gear 224 translates into rotation of the torque transfer shaft 228. In the present embodiment, the rotation axis of the torque transfer shaft 228 is at 90 degrees relative to the rotation axis of the bevel gear 224 although it will be appreciated that angles other than 90 degrees are also contemplated. In an embodiment, for example, the rotation axis of the torque transfer shaft 228 may be parallel to the rotation axis of the bevel gear 224, the bevel gear 224 thus becoming a spur gear.

In the FIG. 8 actuator 240 an enveloping worm shaft and worm gear arrangement 242 is provided. The enveloping gear arrangement 242 includes a worm shaft 244 and a worm gear 246 that is suspended in a pair of pre-loaded centering springs 248. As shown in FIG. 8, the worm shaft 244 is bigger at its ends and smaller in its middle so that it bends slightly around the worm gear 246, also referred to as a wedging worm gear arrangement. Such enveloping gears are effective in carrying more load owing to the larger contact surface between the gears than some other types of gears. In FIG. 8, torque exerted by the slip clutch 94 drives the worm gear 246 which, in turn, rotates the worm shaft 244. Increased torque in the worm gear 246 translates the worm shaft 244 axially against the biasing of the centering springs 248. In operation, as asymmetry between two actuators increases, the torque in the worm gear 246 increases and the worm shaft 244 translates axially. In the exemplary distributed system 100, as the torque in the worm gear 246 approaches and reaches a predetermined threshold torque, the worm gear 246 will drive the worm shaft 244 to wedge or bind up with the worm gear 246 thereby locking the actuator 240 and thus the system 100. In this regard, the enveloping gear arrangement 242 operates as a wedging worm gear load limiter or locking torque brake.

The FIG. 9 actuator 260 also includes an enveloping worm shaft and worm gear arrangement 262. Here, the enveloping gear arrangement 262 includes a worm shaft 264 and a worm gear 266 that is suspended in a pair of pre-loaded centering springs 268, wherein the centering springs 268 are housed in respective reach-around housings 270. As such, the centering springs 268 push against, or are pre-loaded in, their respective housings 270 rather than for example opposite sides of the worm gear 266 and/or the wedge gear of the worm shaft 246. In this arrangement, the worm shaft 264 does not translate axially until a predetermined axial preload of the centering springs 268 is overcome.

Figure 10:
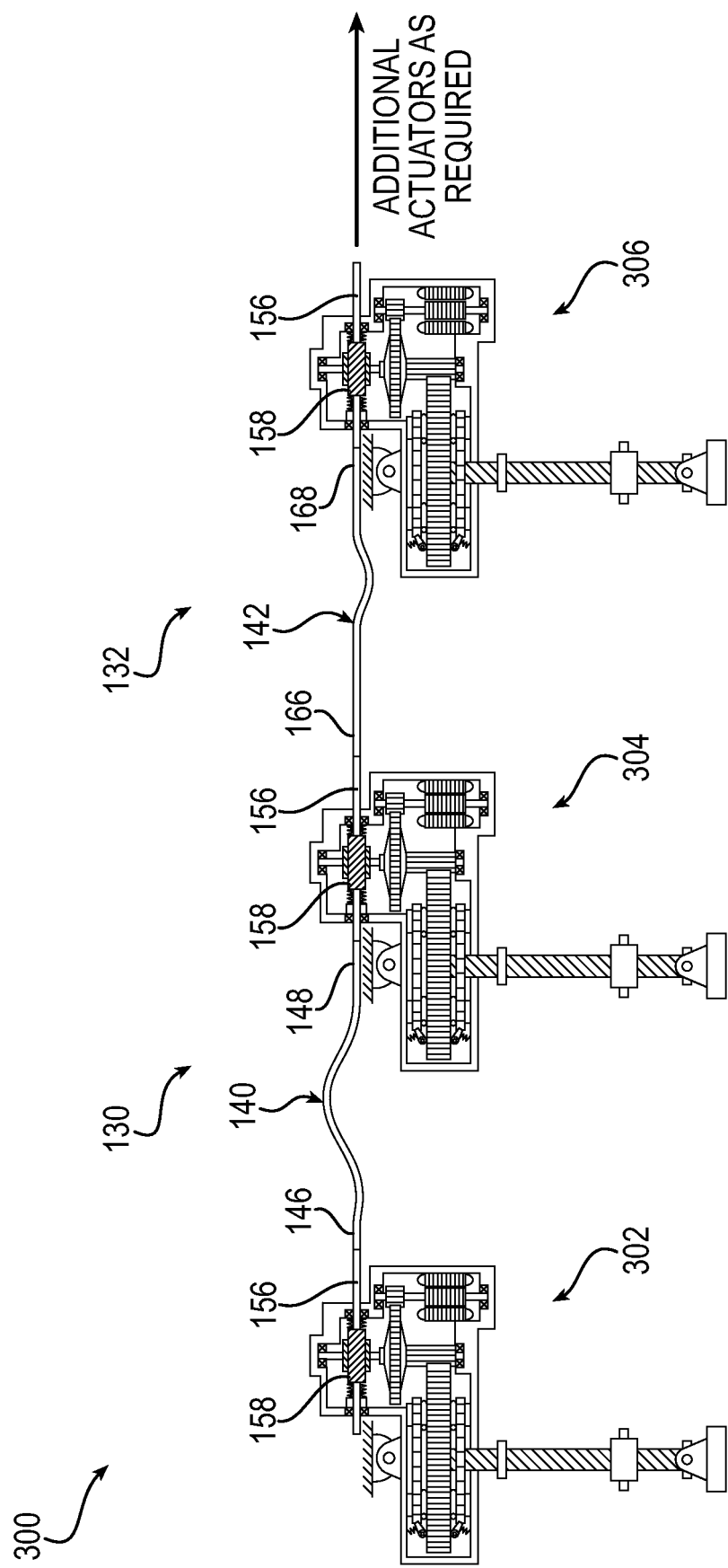
FIG. 10 is an exemplary distributed system according to another embodiment of the invention.
Figure 11:
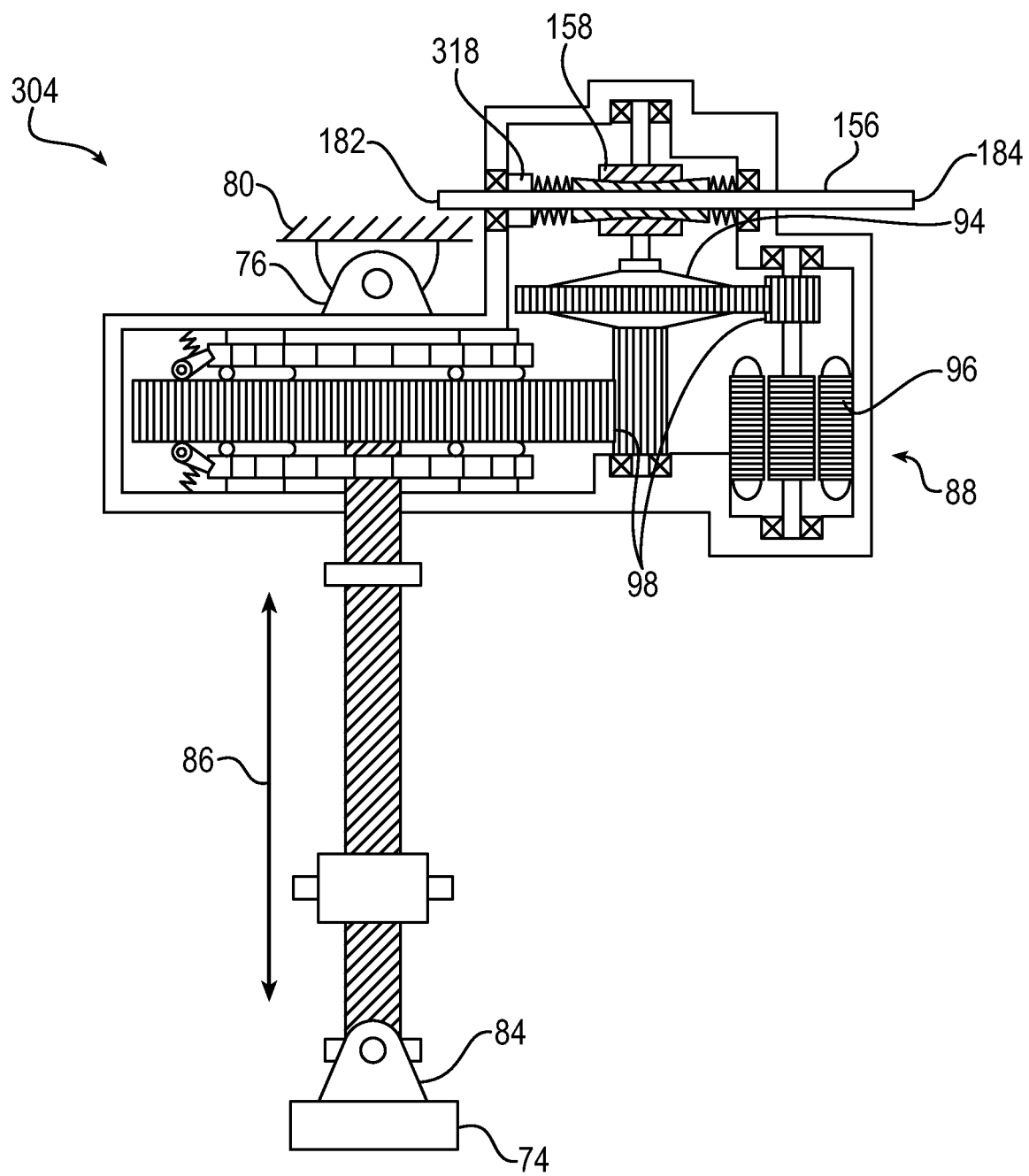
FIG. 11 is an exemplary actuator for use in the system illustrated in FIG. 10, according to another embodiment of the invention.

FIGS. 10 and 11 show a distributed system 300 according to another embodiment of the invention. The distributed system 300 is in many respects similar to the above-referenced distributed systems 60, 70, 100 of FIGS. 2-6, and consequently the same reference numerals are used to denote structures corresponding to similar structures in the systems 60, 70, 100. In addition, the foregoing description of the distributed systems 60, 70, 100 is equally applicable to the distributed system 300 except as noted below. Moreover, it will be appreciated upon reading and understanding the specification that aspects of the distributed systems 60, 70, 100, 300 may be substituted for one another or used in conjunction with one another where applicable.

The distributed system 300 includes a plurality of actuators 302, 304, 306 that each include a locking torque brake 318. In operation, if the torque in any of the actuators 302, 304, 306, for example actuator 302, exceeds a predetermined threshold torque, for example as set in the locking torque brake 318, then the actuator 302 will lock up. The actuators 302, 304, 306 are locked into position with a set pre-load in the flexible synchronization shafts 140, 142. The maximum asymmetry between actuators 302, 304, 306 is a function of the stiffness of the flexible synchronization shafts 140, 142 and the settings of the locking torque brakes 318. The stiffness of the flexible synchronization shafts 140, 142 and the settings of the locking torque brakes 318 can be selected to mitigate a predetermined level of asymmetry.

Turning to FIG. 10, for example, if actuator 302 is locked, then its associated worm gear 158 stops rotating. Initially, actuator 304 and actuator 306 will continue rotating. Actuator 304 will continue to rotate the flexible synchronization shaft 140 and increase the torque in the flexible synchronization shaft 140. The increased torque in the flexible synchronization shaft 140 will lock out the torque brakes 318 in actuator 302 and actuator 304. Actuator 306 will continue to rotate the flexible synchronization shaft 304 until it locks up its torque brake 318 as well. There will be gradually increasing torque going through all of the flexible synchronization shafts 140, 142, and eventually all of the actuators 302, 304, 306 will lock up after the asymmetry permitted by the flexible synchronization shafts 140, 142 exceeds a predetermined threshold asymmetry, or the corresponding predetermined threshold torque associated with that asymmetry.

When the torque in the flexible synchronization shaft 140, 142 exceeds the predetermined threshold torque, the torque brake 318 locks the flexible synchronization shaft 140, 142 down to the actuator housing and thus the aircraft structure 80. The flexible synchronization shaft 140, 142 stops turning, which causes the worm shaft 156 and the worm gear 158 (or the bevel gears 224, 226, depending on the actuator) to stop turning. The kinetic energy and torque of the motor 96 drive through the slip clutch 94 to the locked up worm gear 158 and slip the slip clutch 94. The stopping of the worm gear 158 results in the stopping of the output 86 to which it is connected.

Figure 12:
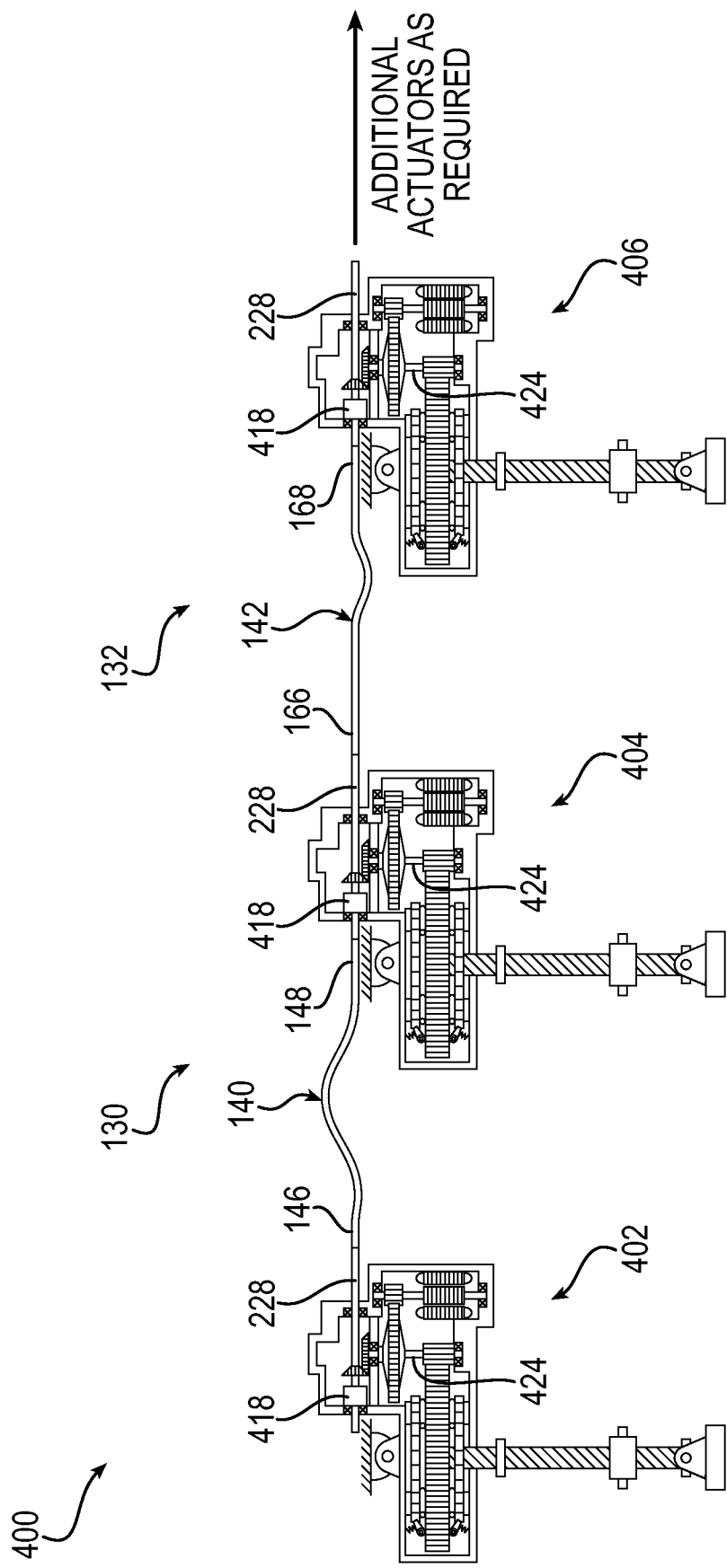
FIG. 12 is an exemplary distributed system according to another embodiment of the invention.
Figure 13:
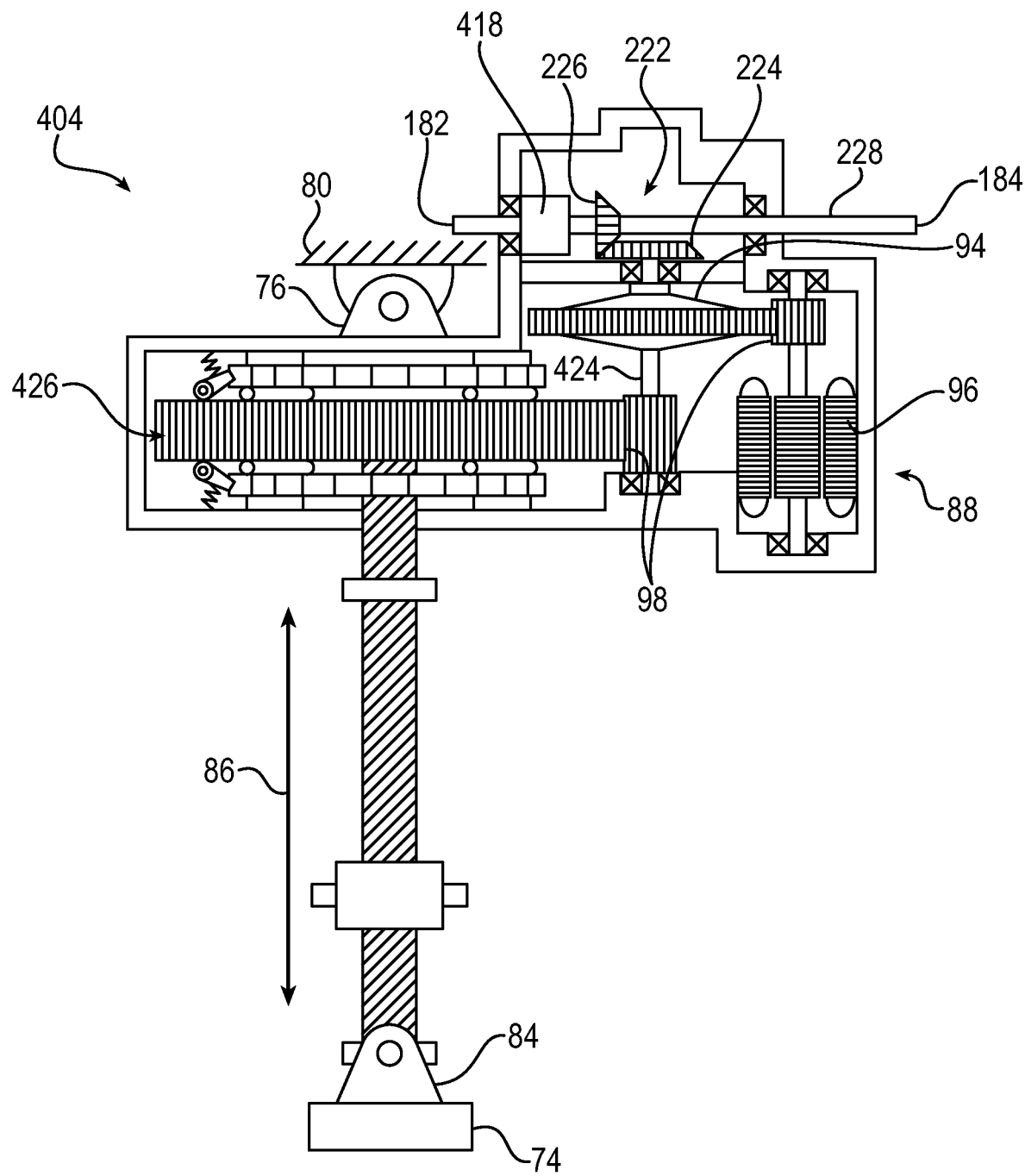
FIG. 13 is an exemplary actuator for use in the system illustrated in FIG. 12, according to another embodiment of the invention.

FIGS. 12 and 13 show a distributed system 400 according to another embodiment of the invention. The distributed system 400 is in many respects similar to the above-referenced distributed systems 60, 70, 100, 300 of FIGS. 2-6 and 10-11, and consequently the same reference numerals are used to denote structures corresponding to similar structures in the systems 60, 70, 100, 300. In addition, the foregoing description of the distributed systems 60, 70, 100, 300 is equally applicable to the distributed system 400 except as noted below. Moreover, it will be appreciated upon reading and understanding the specification that aspects of the distributed systems 60, 70, 100, 300, 400 may be substituted for one another or used in conjunction with one another where applicable.

The distributed system 400 includes a plurality of actuators 402, 404, 406 that each include a locking torque brake 418 and a gear train compliance 424. In the electric motor driven systems described herein, the electric motor 96 can exhibit a certain amount of inertia, i.e. a kinetic energy, during a jam the motor kinetic energy is dissipated in the slip clutch. The locking torque brake 418 is advantageous as it locks the actuator 402, 404, 406 out to the structure 80 and forces the actuator 402, 404, 406 to lock so the kinetic energy of the motor 96 does not drive. In the embodiment of FIGS. 12 and 13, a gear train compliance 424 is provided for example between gear 426 and locking torque brake 418. The gear train compliance 424 cushions the downstream load and gear train kinetic energy induced torque exerted by the inertia back to the torque brake 418.

The invention addresses, among other things, the degree of symmetry and jam potential in an otherwise preferred nearly synchronous electric thrust reverser system or other distributed system. For systems of two or more electromechanical actuators 102, 104, 106 with one or more motors per actuator that are required to operate with high symmetry and or manage jam conditions in unison the actuators 102, 104, 106 may be fit with a mechanical interconnect, also referred to herein as a mechanical synchronization device 130, 132, configured to transfer torque from one actuator 102, 104, 106 to the other(s), and transfer motion and/or prevent motion from one actuator 102, 104, 106 to the other(s), to maintain symmetry between or among actuators 102, 104, 106. Further, the mechanical synchronization device 130, 132 may be equipped with a mechanical load limiting system, for example a locking torque brake, a wedging worm gear load limiter, or other type device, such that the actuators 102, 104, 106 are triggered to lock in the event of any one of the actuator locations or structure jamming.

For systems that require multiple outputs to operate synchronously such as aircraft flaps and slats, thrust reversers, large door drives, etc., electrical synchronization where an electric motor(s) is located at each drive station may have many benefits over traditional complex mechanical drive systems. One such implementation of this might be low slip induction motors running on a single controller as described in Near Synchronous Induction Motor Drive Actuation System, U.S. Pat. No. 9,190,942, though other motor types may be incorporated.

The inventors have identified two potential negative aspects of this approach; namely, potential for non-absolute symmetry due to induction motor slip differences at different loads or due to servo loop inaccuracy in the case of servo controlled systems. Further mitigation of jams in the actuators or movable structures may be of interest as rapid electrical mitigation of these jam conditions may not be sufficient or effective. To mitigate these potential negative effects in systems where they exist, the inventors have developed a solution whereby the primary motive power for each output location is provided by individual electric motor(s), however, a finer level of symmetry and jam management is provided by the mechanical interconnect system, in the illustrative embodiment the mechanical synchronization device 130, 132.

The mechanical interconnect system may be sized for significantly lower loads resulting from minor asymmetries in the applied loads between stations. The mechanical interconnect transfers mechanical power from any motors/actuators that are leading the average position to those motors/actuators that are lagging the average position. This mechanical power is typically small relative to the size of mechanical components required to carry the full power of the many outputs as the primary driving source. Further the mechanical synchronization device may be fitted with load limiting devices to further protect against jam conditions. A predetermined lost motion may also be incorporated to tailor the output response of the system.

It will be appreciated that hydraulic motion transfer components could be used alternate to or in addition to a gear arrangement. For example, in an hydraulic system each actuator may have a piston in cylinder that is analog to the motor and output stage, as well as a mechanical interconnect typically consisting of acme screws/nut assembly, worm or bevel gears and flexible shafts.

In one embodiment, it may be assumed that the system is using at least one independent near synchronous induction motor driven system of one or more motors each such as described in U.S. Pat. No. 9,190,942 B2, wherein the speed and/or position control of the system relies on the low slip induction motors closely following some specified Volts per Frequency (V/F) profile in an open loop manner such that closed loop speed and/or position control of each motor is not required. In such a system the output position error can be a function of motor load and slip differences between actuator stations. In this system, an additional mechanical synchronization device 130, 132 may be employed between the actuators 102, 104, 106 to allow for some torque transfer between actuators 102, 104, 106 to aid in maintaining a tighter synchronization between the actuators 102, 104, 106 than feasible with only the controlled low slip induction motors. The mechanical synchronization device 130, 132 may include flexible shafts, or any other mechanical power transmission device or devices, including for example rigid shafts such as torque tubes, and/or universal joints, and/or angle gearboxes, depending on the system constraints and/or design requirements. In an embodiment, the mechanical synchronization device 130, 132 may be sized only for the asymmetric loading of the system in contrast to the full driving power requirements of, for example, the traditional mechanically driven system, thus saving weight and envelope in the system. Further the synchronization system may include load limiting features such as torque brakes or locks, in the mechanical synchronization device 130, 132, such that the system is mechanically locked in the event of excessive load transfer between actuators. The mechanism for this lock may act directly on the output of the actuator 102, 104, 106, and/or act on the flexible synchronization shaft 140, 142, and/or on any structure or point in between. Numerous methods for implementing such torque brakes or locks are described herein, and those skilled in the art will appreciate that numerous other types of brakes or locks may be suitable.

In the distributed systems 60, 70, 100, 300, 400, the motion providers 88 may include a brushless DC motor (BLDC), a brush DC motor, and/or a stepper motor, and the power module and power module controller 90 may be configured to control the motors to follow a predetermined position profile in a closed loop manner.

As previously noted, the synchronization system described herein may also be applied to a system of multiple electromechanical servo actuators or even a system of multiple hydraulic motor driven actuators.

This application includes description that is provided to enable a person of ordinary skill in the art to practice the various aspects described herein. While the foregoing has described what are considered to be the best mode and/or other examples, it is understood that various modifications to these aspects will be readily apparent to those skilled in the art, and the generic principles defined herein may be applied to other aspects. It is understood that the specific order or hierarchy of steps or blocks in the processes disclosed is an illustration of exemplary approaches. Based upon design preferences, it is understood that the specific order or hierarchy of steps or blocks in the processes may be rearranged. The accompanying method claims present elements of the various steps in a sample order, and are not meant to be limited to the specific order or hierarchy presented. Thus, the claims are not intended to be limited to the aspects shown herein, but are to be accorded the full scope consistent with the language of the claims.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A distributed system, comprising:
    a plurality of motion provider-driven actuators for actuating movement of one or more control surface components of an aircraft, wherein each motion provider-driven actuator has a first end coupled to a structure of the aircraft and a second end coupled to one of the one or more control surface components and each motion provider-driven actuator additionally includes a drive path from a motion provider to the one or more control surface components, wherein the one or more control surface components is configured to move along the respective drive path;
    a power module controller operable to simultaneously output motor drive power from a power module through an electrical bus to at least two of the plurality of the motion providers of the respective motion provider-driven actuators in a synchronous or nearly synchronous manner to actuate movement of the one or more control surface components; and,
    a mechanical synchronization device between at least two of the plurality of motion provider-driven actuators that transfers torque between the at least two motion provider-driven actuators to maintain symmetry between the motion provider-driven actuators to augment the synchronous or nearly synchronous operation provided by the power module controller to the motion provider-driven actuators.

2. The distributed system of claim 1, wherein the mechanical synchronization device is configured to transfer motion between at least two motion provider-driven actuators to maintain symmetry between the at least two motion provider-driven actuators.

3. The distributed system of claim 1, wherein the mechanical synchronization device is configured to prevent motion between at least two motion provider-driven actuators to maintain symmetry between the at least two motion provider-driven actuators.

4. The distributed system of claim 1, wherein the motion provider includes an induction motor and/or a brushless DC servo motor (BLDC).

5. The distributed system of claim 1, wherein the mechanical synchronization device includes a flexible synchronization shaft.

6. The distributed system of claim 1, wherein the mechanical synchronization device includes a rigid shaft, a universal joint, and/or an angle gearbox.

7. The distributed system of claim 1, wherein the mechanical synchronization device is sized to transfer torque between the at least two motion provider-driven actuators up to a predetermined threshold torque associated with asymmetric loading between the at least two motion provider-driven actuators.

8. The distributed system of claim 1, wherein the mechanical synchronization device transfers mechanical power from motion provider-driven actuators that are leading the average position to motion provider-driven actuators that are lagging the average position.

9. The distributed system of claim 1, wherein the mechanical synchronization device transfers mechanical power from motion providers that are leading the average position to motion providers that are lagging the average position.

10. A distributed system, comprising:
a plurality of actuators for actuating movement of one or more control surface components of an aircraft, wherein each actuator has a first end coupled to a structure of the aircraft and a second end coupled to one of the one or more control surface components and each actuator additionally includes a drive path from a motion provider to the one or more control surface components, wherein the one or more control surface components is configured to move along the respective drive path;
a power module controller operable to simultaneously output motor drive power from a power module through an electrical bus to at least two of the plurality of the motion providers in a synchronous or nearly synchronous manner to actuate movement of the one or more control surface components; and,
a mechanical synchronization device between at least two of the plurality of actuators that transfers torque between the at least two actuators to maintain symmetry between the actuators;
wherein the mechanical synchronization device includes a load limiting device that locks an actuator when the actuator reaches a predetermined threshold torque.

11. The distributed system of claim 10, wherein the load limiter locks the output of an actuator.

12. The distributed system of claim 10, wherein the load limiter locks a flexible or rigid synchronization shaft of the mechanical synchronization device.

13. The distributed system of claim 10, wherein the load limiter locks at a structure disposed between an output of an actuator and a flexible synchronization shaft of the mechanical synchronization device.

14. The distributed system of claim 10, wherein the load limiter includes a locking torque brake and/or a wedging worm gear load limiter.

15. The distributed system of claim 14, further comprising a gear train compliance to cushion torque brake locking impact.

16. The distributed system of claim 1, wherein the mechanical synchronization device incorporates a predetermined lost motion to tailor the output response of the system.

17. The distributed system of claim 1, wherein the motion providers include low slip induction motors, and the power module controller controls the motors to follow a predetermined Volts per Frequency (V/F) profile in an open loop manner such that closed loop speed and/or position control of each motor is not required.

18. The distributed system of claim 17, wherein an output position error of the system is a function of motor load and slip differences between actuator stations.

19. The distributed system of claim 1, wherein the motion providers include a brushless DC motor (BLDC), a brush motor, and/or a stepper motor, and the power module controller is configured to control the motors to follow a predetermined position profile in a closed loop manner.

20. A distributed system, comprising:
a plurality of electromechanical servo motion provider-driven actuators for actuating movement of one or more control surface components of an aircraft, wherein each motion provider-driven actuator has a first end coupled to a structure of the aircraft and a second end coupled to one of the one or more control surface components and each motion provider-driven actuator additionally includes a drive path from a motion provider to the one or more control surface components, wherein the one or more control surface components is configured to move along the respective drive path;
a controller operable to output motor drive power from a power module through a bus to at least two of the plurality of the motion providers of the respective motion provider-driven actuators in a synchronous or nearly synchronous manner to actuate movement of the one or more control surface components; and,
a mechanical synchronization device between at least two of the plurality of motion provider-driven actuators that transfers torque between the at least two motion provider-driven actuators to maintain symmetry between the motion provider-driven actuators to augment the synchronous or nearly synchronous operation provided by the power module controller to the motion provider-driven actuators.

21. A distributed system, comprising:
a plurality of hydraulic motor driven motion provider-driven actuators for actuating movement of one or more control surface components of an aircraft, wherein each motion provider-driven actuator has a first end coupled to a structure of the aircraft and a second end coupled to one of the one or more control surface components and each motion provider-driven actuator additionally includes a drive path from a motion provider to the one or more control surface components, wherein the one or more control surface components is configured to move along the respective drive path;
a controller operable to output flow control commands to a hydraulic control valve system to provide hydraulic flow to at least two of the plurality of the motion providers of the respective motion provider-driven actuators in a synchronous or nearly synchronous manner to actuate movement of the one or more control surface components; and,
a mechanical synchronization device between at least two of the plurality of motion provider-driven actuators that transfers torque between the at least two motion provider-driven actuators to maintain symmetry between the motion provider-driven actuators to augment the synchronous or nearly synchronous operation provided by the power module controller to the motion provider-driven actuators.

\* \* \* \* \*